United States Patent
Hayashida et al.

(10) Patent No.: US 9,935,345 B2
(45) Date of Patent: Apr. 3, 2018

(54) COOLING STRUCTURE OF POWER STORAGE DEVICE

(71) Applicant: HONDA MOTOR CO., LTD., Tokyo (JP)

(72) Inventors: Atsushi Hayashida, Wako (JP); Kazuhisa In, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 335 days.

(21) Appl. No.: 14/718,091

(22) Filed: May 21, 2015

(65) Prior Publication Data
US 2015/0349394 A1 Dec. 3, 2015

(30) Foreign Application Priority Data

May 28, 2014 (JP) .................................. 2014-109643

(51) Int. Cl.
*H01M 10/6551* (2014.01)
*H01M 2/10* (2006.01)
(Continued)

(52) U.S. Cl.
CPC ..... *H01M 10/6551* (2015.04); *H01M 2/1077* (2013.01); *H01M 10/613* (2015.04); *H01M 10/625* (2015.04); *H01M 10/647* (2015.04); *H01M 10/653* (2015.04); *H01M 10/6554* (2015.04); *H01M 10/6556* (2015.04)

(58) Field of Classification Search
CPC ........... H01M 10/6551; H01M 10/625; H01M 10/613; H01M 10/647; H01M 10/6556; H01M 10/6554; H01M 10/653; H01M 2/1077
See application file for complete search history.

(56) References Cited

U.S. PATENT DOCUMENTS 3,972,737 A * 8/1976 Sullivan .............. H01M 2/0242
220/516
8,703,321 B2 4/2014 Kim et al.
(Continued)

FOREIGN PATENT DOCUMENTS

CN 102751545 10/2012
JP 2011-034775 2/2011
(Continued)

OTHER PUBLICATIONS

Japanese Office Action for corresponding JP Application No. 2014-109643, Dec. 20, 2016 (w/ English machine translation).
(Continued)

*Primary Examiner* — Ula C Ruddock
*Assistant Examiner* — Matthew W Van Oudenaren
(74) *Attorney, Agent, or Firm* — Mori & Ward, LLP

(57) ABSTRACT

A cooling structure of a power storage device includes a cooling plate, a partition member, and a heat conduction material. The cooling plate is to cool a storage battery bank including storage batteries which are stacked. The partition member is disposed between the storage battery bank and the cooling plate and includes divided areas. At least one of the storage batteries is provided in each of the divided areas. The heat conduction material is accommodated in at least one of the divided areas and is in contact with the at least one of the storage batteries and the cooling plate.

15 Claims, 6 Drawing Sheets

(51) Int. Cl.
*H01M 10/625*  (2014.01)
*H01M 10/653*  (2014.01)
*H01M 10/647*  (2014.01)
*H01M 10/6556* (2014.01)
*H01M 10/6554* (2014.01)
*H01M 10/613*  (2014.01)

(56) References Cited

U.S. PATENT DOCUMENTS

2012/0214038 A1* 8/2012 Kim .................... H01M 2/1061
                                                          429/99
2012/0270081 A1* 10/2012 Horii ................... H01M 2/024
                                                          429/72

FOREIGN PATENT DOCUMENTS

JP          2012-33306       2/2012
JP          2012-226995      11/2012

OTHER PUBLICATIONS

Chinese Office Action for corresponding CN Application No. 201510204461.5, Mar. 24, 2017 (w/ English machine translation).

* cited by examiner

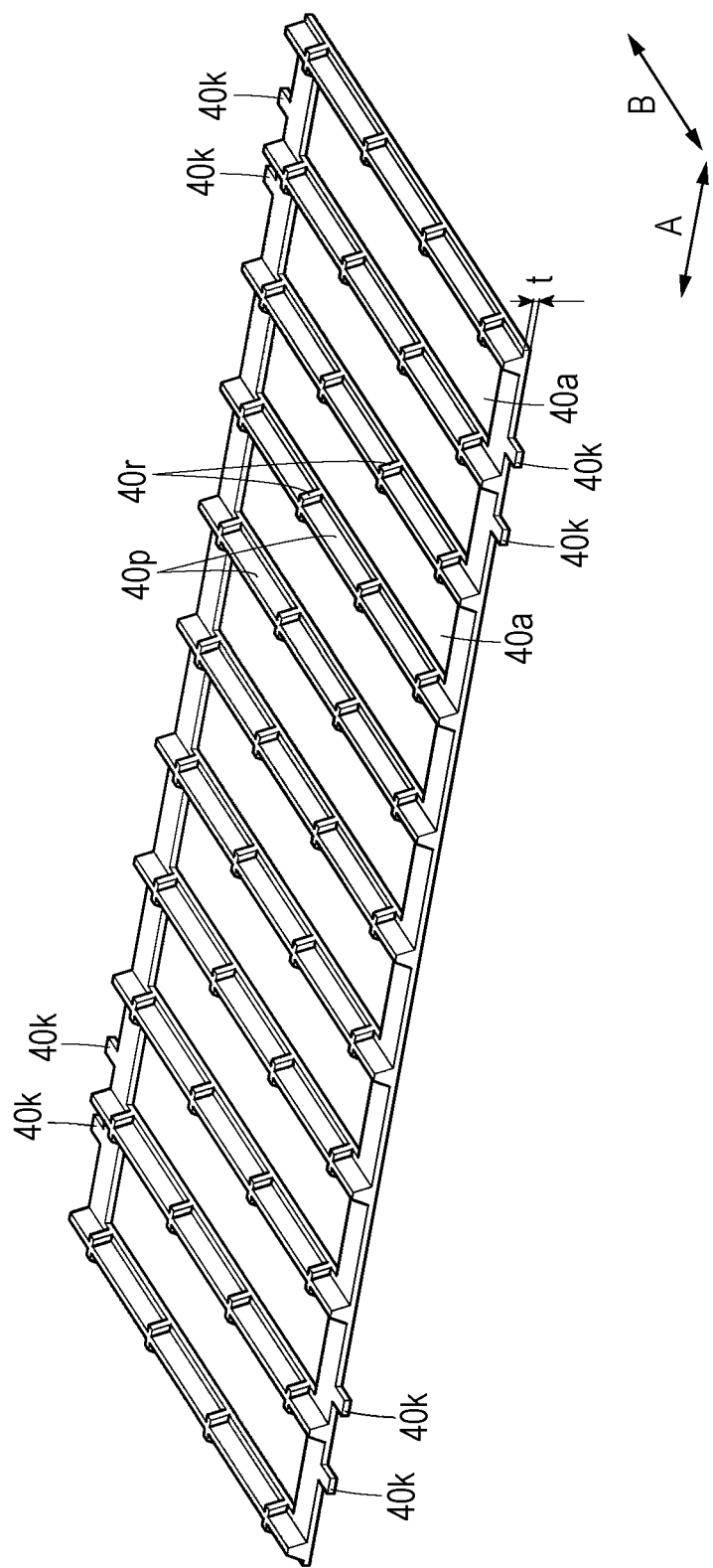

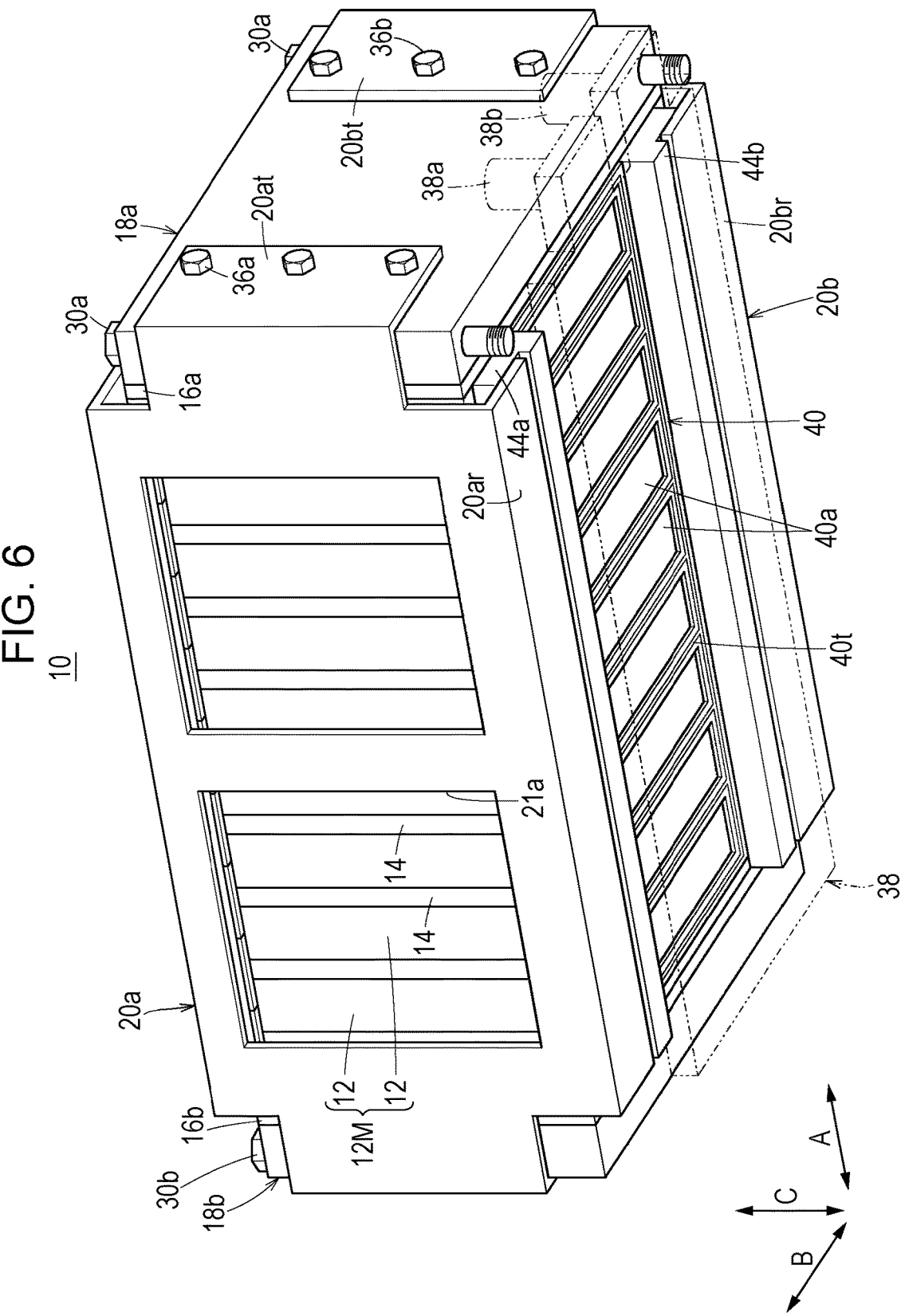

COOLING STRUCTURE OF POWER STORAGE DEVICE

CROSS-REFERENCE TO RELATED APPLICATIONS

The present application claims priority under 35 U.S.C. § 119 to Japanese Patent Application No. 2014-109643, filed May 28, 2014, entitled "Cooling Structure of Power Storage Device." The contents of this application are incorporated herein by reference in their entirety.

BACKGROUND

1. Field

The present disclosure relates to a cooling structure of a power storage device.

2. Description of the Related Art

Generally, a power storage module including a storage battery bank (a battery module) in which a plurality of storage batteries (battery cells) are stacked is known. The above power storage module is mounted in a hybrid vehicle or a motor-driven vehicle such as an EV, for example.

In the power storage module, performance and life of the storage batteries are dependent on temperature and the storage batteries become easily degraded when the temperatures of the storage batteries become high. Accordingly, in order to improve durability of the storage batteries, the storage batteries need to be cooled in a preferable manner. Now, a cooling structure of a battery pack disclosed in Japanese Unexamined Patent Application Publication No. 2011-034775, for example, is known.

In the above cooling structure, a battery pack is formed by arranging a plurality of square batteries while separators having insulation properties are interposed therebetween. Furthermore, a cooling plate is provided on the cooling surface side of the battery pack while a heat conduction sheet having an insulation property is interposed therebetween.

SUMMARY

According to one aspect of the present invention, a cooling structure of a power storage device including a storage battery bank in which a plurality of storage batteries are stacked includes a cooling plate, a partition member, and a heat conduction material. The cooling plate cools the storage battery bank. The partition member is disposed between the storage battery bank and the cooling plate and includes a plurality of divided areas that are divided per each storage battery or per every plurality of storage batteries. The heat conduction material is accommodated in each of the divided areas and is in contact with a corresponding storage battery and the cooling plate in an integral manner.

According to another aspect of the present invention, a cooling structure of a power storage device includes a cooling plate, a partition member, and a heat conduction material. The cooling plate is to cool a storage battery bank including storage batteries which are stacked. The partition member is disposed between the storage battery bank and the cooling plate and includes divided areas. At least one of the storage batteries is provided in each of the divided areas. The heat conduction material is accommodated in at least one of the divided areas and is in contact with the at least one of the storage batteries and the cooling plate.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 5 is a partially enlarged perspective view for describing a partition member constituting the power storage module.

FIG. 6 is a perspective view for describing the power storage module from a lower portion side.

DESCRIPTION OF THE EMBODIMENTS

Figure 1:
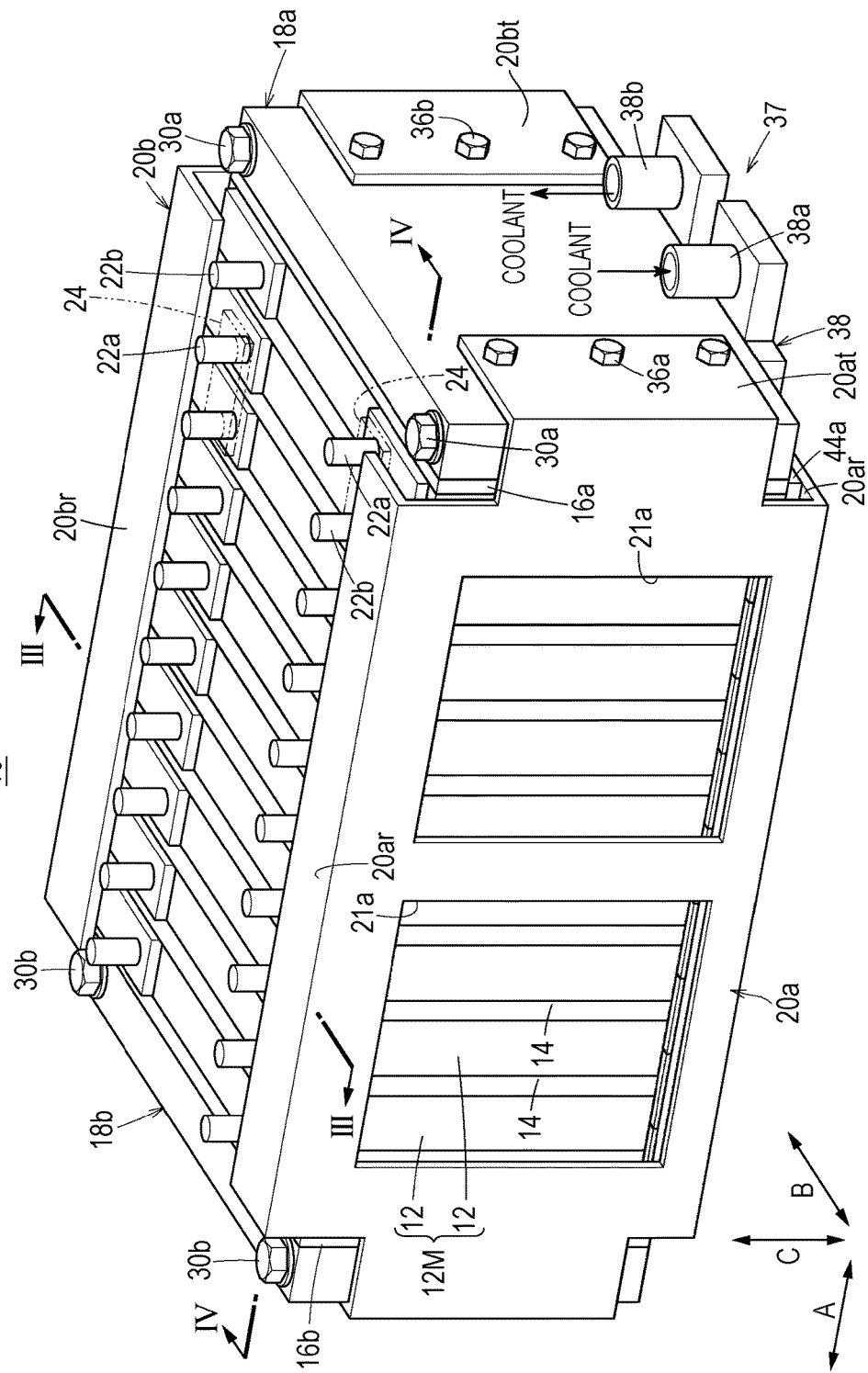
FIG. 1 is a schematic perspective view for describing a power storage module according to an exemplary embodiment of the present disclosure.

The embodiments will now be described with reference to the accompanying drawings, wherein like reference numerals designate corresponding or identical elements throughout the various drawings.

Figure 2:
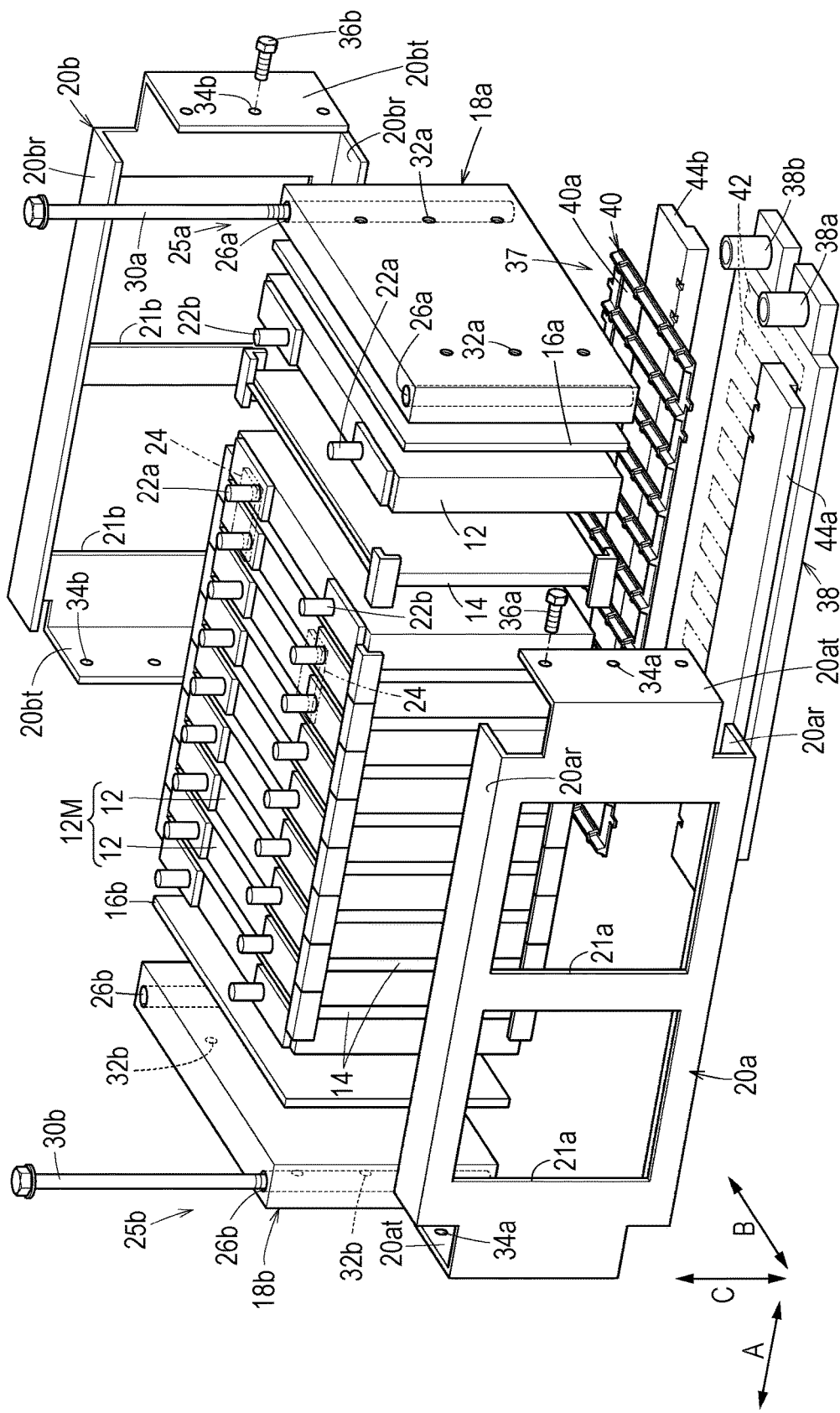
FIG. 2 is an exploded perspective view for describing essential portions of the power storage module.

As illustrated in FIGS. 1 and 2, a power storage module 10 according to an exemplary embodiment of the present disclosure is, for example, mounted in a hybrid car or a motor-driven vehicle such as an EV (not shown).

The power storage module 10 includes a storage battery bank (a battery module) 12M in which a plurality of storage batteries (battery cells) 12 are stacked in the horizontal direction (an arrow A direction). The storage batteries 12 each have a rectangular shape and, while being disposed in an upright position, are stacked alternately in the arrow A direction with separators (holders) 14 having an insulation property.

As illustrated in FIG. 2, rectangular end plates 18a and 18b are disposed at both ends of the storage battery bank 12M in the stacking direction while having insulator plates (or may be separators 14) 16a and 16b having an adiabatic function and an insulating function interposed therebetween. The end plates 18a and 18b are connected to each other with, for example, a pair of connecting bands 20a and 20b that are disposed at both ends in an arrow B direction and that extend in the arrow A direction (see FIGS. 1 and 2).

Each of the storage batteries 12 is, for example, formed of a lithium-ion battery and has a rectangular (or a square) shape. A positive pole (or a negative pole) terminal 22a and a negative pole (or a positive pole) terminal 22b are provided on the upper surface of each of the storage batteries 12. Each of the terminal 22a and the terminal 22b of the storage batteries 12 that are adjacent to each other are connected with a bus bar 24.

Figure 4:
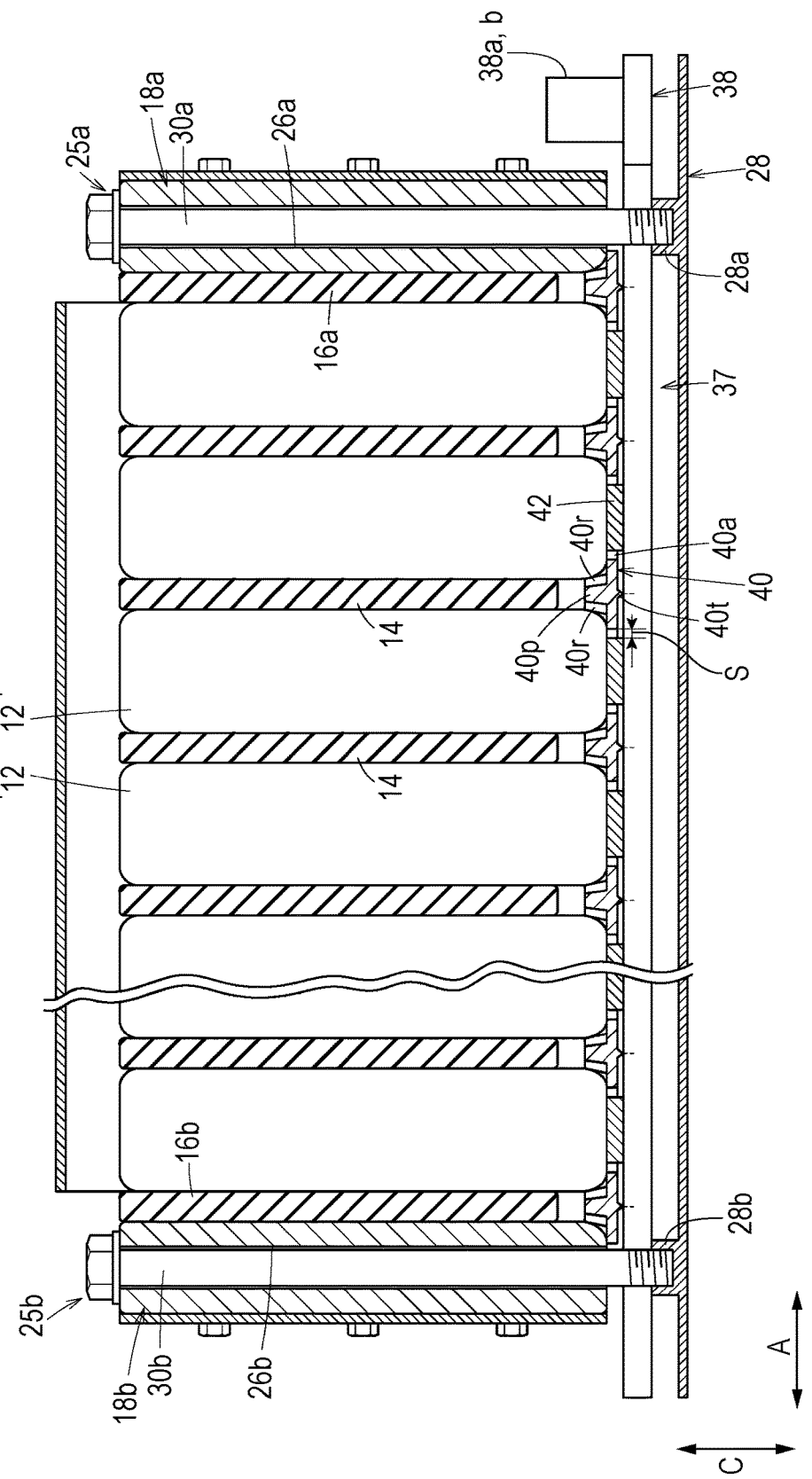
FIG. 4 is a cross-sectional view of the power storage module taken along line IV-IV of FIG. 1.

The insulator plates 16a and 16b are each configured with a substantially tabular shape (the shape may be the same as that of the separator 14). The end plates 18a and 18b are each configured with a substantially tabular shape. As illustrated in FIGS. 2 and 4, a pair of holes 26a are formed in the edge portions at both ends of the end plate 18a in the arrow B direction so as to penetrate the end plate 18a in an arrow C direction. The pair of holes 26a are provided inside the connecting bands 20a and 20b and accommodate therein a pair of fastening bolts (fastening members) 30a for fixing the power storage module 10 to the installation area 28. The installation area 28 is constituted by, for example, a sheet metal of the motor-driven vehicle and is provided with a pair of female screw portions 28a into which the pair of fastening bolts 30a are screwed.

As illustrated in FIG. 2, sets of a plurality of, for example, three, screw holes 32a arranged in the arrow C direction are provided in a plate surface of the end plate 18a at portions on the center side of the plate surface with respect to the pair of holes 26a so as to be parallel to each other. The screw holes 32a are each formed in the arrow A direction and are set at positions that do not interfere with the holes 26a.

Note that the end plate 18b side is configured in a similar manner to the configuration of the end plate 18a side described above; accordingly, the same components are attached with the same reference numerals while reference signs b are attached in place of reference signs a and detailed description of the components is omitted.

As illustrated in FIGS. 1 and 2, the connecting band 20a is formed of a laterally long sheet metal (a metal plate) and, for example, openings 21a for reducing weight and for introducing a coolant for cooling the storage batteries 12 are formed therein as required. When viewed from the front, that is, from one end in the stacking direction of the storage battery bank 12M, the connecting band 20a has a U-shaped section. Mounting portions (end portions) 20at and 20at at the end of the connecting band 20a in the longitudinal direction (in the direction of the long side) are each disposed so as to cover a corresponding one of the short sides of the end plates 18a and 18b.

A plurality of holes 34a are integrally formed in each of the mounting portions 20at. Each of the holes 34a is disposed coaxially with the corresponding screw holes 32a and 32b of the end plates 18a and 18b. Screws 36a are inserted into the holes 34a and 34a and are screwed into the screw holes 32a and 32b so as to fix the mounting portions 20at of the connecting band 20a and the end plates 18a and 18b to each other. The mounting portions 20at are fixed to the end plates 18a and 18b at portions on the center portion side of the plate surface with respect to the holes 26a.

Bend portions 20ar that bend inwards in the horizontal direction from the vertical direction are provided at both upper and lower ends of the connecting band 20a. Each of the bend portions 20ar extend in the stacking direction of the storage battery bank 12M and holds an edge portion of the storage battery bank 12M.

The connecting band 20b is configured in a similar manner to the configuration of the connecting band 20a described above; accordingly, the same components are attached with the same reference numerals while reference signs b are attached in place of reference signs a and detailed description of the components is omitted.

Figure 3:
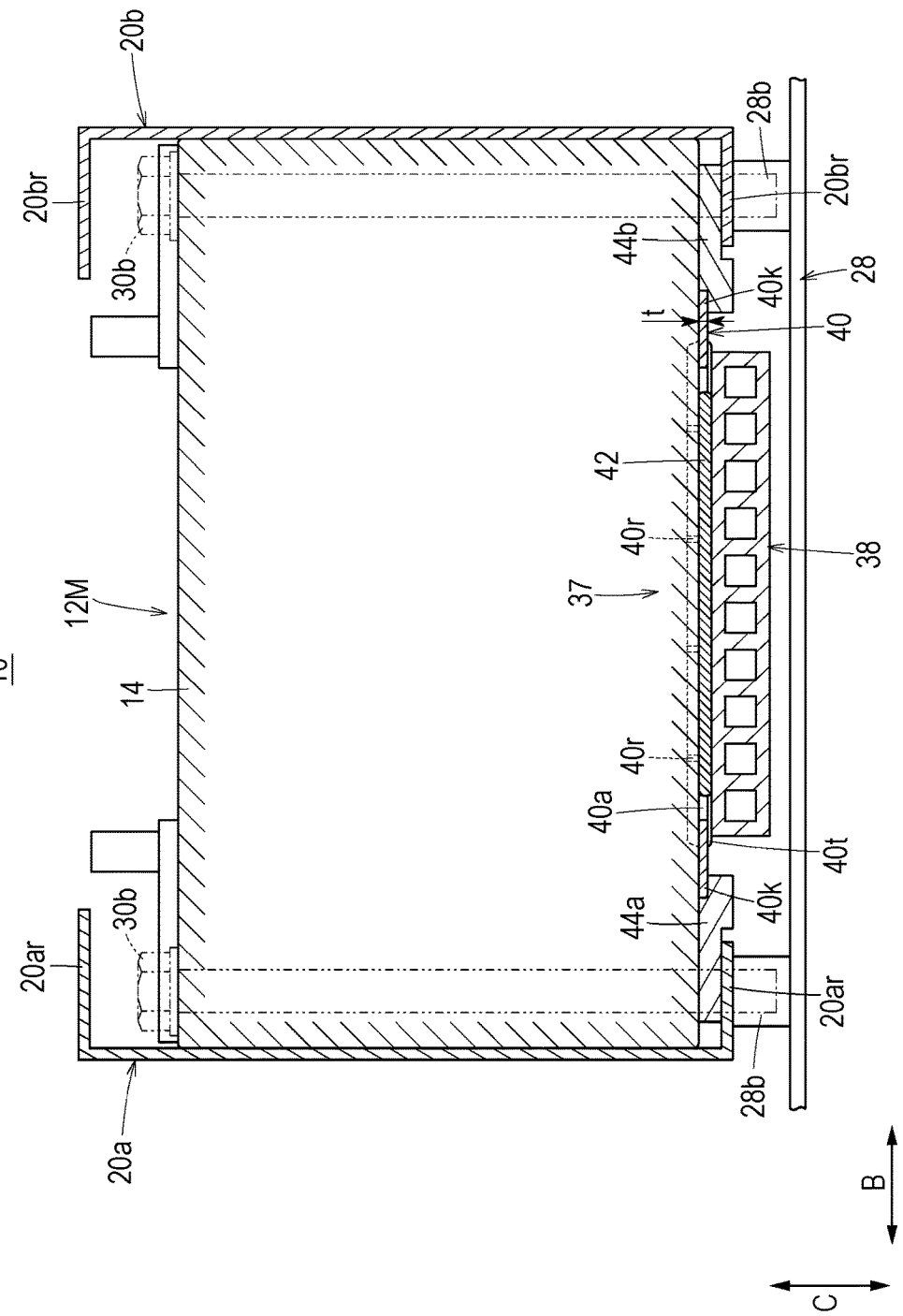
FIG. 3 is a cross-sectional view of the power storage module taken along line III-III of FIG. 1.

A cooling structure 37 is mounted on the bottom portion of the power storage module 10. As illustrated in FIGS. 2 to 4, the cooling structure 37 includes a cooling plate, for example, a heat sink 38, that cools the storage battery bank 12M and a partition member 40 that is disposed between the storage battery bank 12M and the heat sink 38.

The heat sink 38 is, for example, fixed to the bottom portions of the bend portions 20ar and 20br on the lower end sides of the connecting bands 20a and 20b with screw clamps or the like. The dimension of the heat sink 38 in the arrow A direction is configured so as to be substantially the same as the dimension of the storage battery bank 12M in the arrow A direction. A coolant supply port 38a and a coolant discharge port 38b are provided at one end of the heat sink 38 in the long direction, that is, at the end portion on the end plate 18a side, for example.

The partition member 40 includes a plurality of divided areas 40a that are divided per each storage battery 12, and the divided areas 40a each accommodate therein heat conduction gel 42 serving as a heat conduction material that is in contact with the corresponding storage battery 12 and the heat sink 38 in an integral manner. Silicone gel is used, for example, for the heat conduction gel 42; however, the heat conduction gel 42 is not limited to silicone gel. As illustrated in FIGS. 4 and 5, the partition member 40 is formed in a narrow frame shape and includes a plurality of partition walls 40p that extend between the storage batteries 12. Rib portions 40r that protrude towards the storage batteries 12 and for positioning the storage batteries 12 are provided on both sides of each of the partition walls 40p so as to be spaced apart at predetermined intervals in the arrow B direction.

As illustrated in FIG. 4, a projection portion 40t that bulges out to the heat sink 38 side (the opposite side with respect to the rib portions 40r) and that is inserted into the heat sink 38 is provided on each of the partition walls 40p. As illustrated in FIG. 6, the projection portions 40t extend in the arrow B direction and the arrow A direction and have a function of preventing a gap from being created between the heat sink 38 and the partition member 40.

As illustrated in FIG. 5, a plurality of lock portions 40k that each protrude outwards and that are spaced apart at predetermined intervals in the arrow A direction are formed at both ends of the partition member 40 in the arrow B direction. The plate thickness t of the partition member 40 sets the film thickness of the heat conduction gel 42, and spaces S in which no heat conduction gel 42 is filled are formed in the divided areas 40a to relax the reactive force of the heat conduction gel 42.

As illustrated in FIG. 2, spacers 44a and 44b each having a substantially plate shape that is long in the arrow A direction are provided between the bend portions 20ar and 20br on the lower end sides of the connecting bands 20a and 20b and the bottom surface of the storage battery bank 12M. As illustrated in FIG. 6, both ends of the partition member 40 in the arrow B direction are fixed to the spacers 44a and 44b. The lock portions 40k of the partition member 40 are press fitted into the spacers 44a and 44b and maintains each of the divided areas 40a in a liquid tight state (see FIG. 3).

When manufacturing the power storage module 10 configured in the above manner, a plurality of storage batteries 12 are stacked so as to form the storage battery bank 12M. The end plate 18a is provided on one end of the storage battery bank 12M in the stacking direction while having the insulator plate 16a interposed therebetween. The end plate 18b is provided on the other end of the storage battery bank 12M in the stacking direction while having the insulator plate 16b interposed therebetween. Furthermore, each of the mounting portions 20at and 20bt of the pair of connecting bands 20a and 20b are fixed to the end plates 18a and 18b with the screws 36a and 36b.

The cooling structure 37 is mounted on the lower end portion of the storage battery bank 12M. The partition member 40 is disposed so as to be substantially in contact with the bottom surface of the storage battery bank 12M with the spacers 44a and 44b. While held by the bend portions 20ar and 20br on the lower end sides of the connecting bands 20a and 20b, the heat sink 38 is, for example, fixed with screws and the heat conduction gel 42 is disposed on the heat sink 38 with the partition member 40.

Subsequently, the pair of fastening bolts 30a are inserted into the pair of holes 26a of the end plate 18a and the tip portions of the fastening bolts 30a are screwed into the pair of female screw portions 28a. Meanwhile, the pair of fastening bolts 30b are inserted into the pair of holes 26b of the end plate 18b and the tip portions of the fastening bolts 30b are screwed into the pair of female screw portions 28b. Accordingly, the power storage module 10 is fixed to the installation area 28.

In such a case, as illustrated in FIGS. 2 to 4, in the present exemplary embodiment, the heat conduction gel 42 that is in contact with the storage batteries 12 and the heat sink 38 in an integral manner is accommodated inside each of the divided areas 40a provided in the partition member 40. Accordingly, since the heat conduction gel 42 is in contact with each of the storage batteries 12, variation in temperature among the storage batteries 12 can be suppressed and, advantageously, intensive degradation of some of the storage batteries 12 can be suppressed.

Moreover, the heat conduction gel 42 can be provided in a thin film shape and reduction in weight and size can be made, and, further, each of the storage batteries 12 can be favorably cooled with an economical configuration. Furthermore, since the partition member 40 includes the divided areas 40a that are divided per each storage battery 12, the thickness of the heat conduction gel 42 in each of the divided areas 40a can be defined. With the above, effects such as suppression of variation in the thickness dimension of the heat conduction gel 42 caused by external force and suppression of leakage of the heat conduction gel 42 when, for example, the power storage module 10 is inclined can be obtained.

Furthermore, as illustrated in FIGS. 4 and 5, the partition member 40 includes the plurality of partition walls 40p that extend between the storage batteries 12 and rib portions 40r that protrude towards the storage batteries 12 at both sides of each of the partition walls 40p. Accordingly, advantageously, each of the storage batteries 12 can be reliably positioned with a simple and compact configuration.

Furthermore, the projection portion 40t that bulges out to the heat sink 38 side (the opposite side with respect to the rib portions 40r) and that is inserted into the heat sink 38 is provided on each of the partition walls 40p. Accordingly, creation of a gap between the heat sink 38 and the partition member 40 can be suppressed.

Note that in the present exemplary embodiment, a gelatinous component is used for the heat conduction material; however, not limited to the above, a rubbery component or a putty-like component may be used. Furthermore, in the present exemplary embodiment, the partition member 40 is divided per each storage battery 12; however, not limited to the above, the partition member 40 may be divided per every plurality of storage batteries 12. For example, the partition member 40 may be divided per every two storage batteries 12.

The present disclosure describes a cooling structure of a power storage device including a storage battery bank in which a plurality of storage batteries are stacked. The cooling structure includes a cooling plate that cools the storage battery bank, and a partition member that is disposed between the storage battery bank and the cooling plate and that includes a plurality of divided areas that are divided per each storage battery or per every plurality of storage batteries. Furthermore, a heat conduction material that is in contact with a storage battery and the cooling plate in an integral manner is accommodated in each divided area.

Furthermore, in the cooling structure, the partition member preferably includes a partition wall that extends between the storage batteries, and a rib portion that protrudes towards a corresponding storage battery and that positions the storage battery is preferably provided on the partition wall.

Furthermore, in the cooling structure, a projection portion that is inserted into the cooling plate and that suppresses a gap from being created between the cooling plate and the partition member is preferably provided on the partition wall.

Furthermore, in the cooling structure, a space in which no heat conduction material is filled is preferably formed in each of the divided areas.

According to the present disclosure, the heat conduction material that is in contact with a storage battery and the cooling plate in an integral manner is accommodated in each divided area provided in the partition member. Accordingly, since the heat conduction material is in contact with each of the storage batteries, variation in temperature among the storage batteries can be suppressed and intensive degradation of some of the storage batteries can be suppressed.

Moreover, the heat conduction gel can be provided in a thin film shape and reduction in weight and size can be made, and, further, each of the storage batteries can be favorably cooled with an economical configuration. Furthermore, since the partition member includes the divided areas that are divided per each storage battery, the thickness of the heat conduction gel in each of the divided areas can be defined. With the above, variation in the thickness dimension of the heat conduction gel caused by external force and leakage of the heat conduction gel can be suppressed.

Obviously, numerous modifications and variations of the present invention are possible in light of the above teachings. It is therefore to be understood that within the scope of the appended claims, the invention may be practiced otherwise than as specifically described herein.

What is claimed is:

1. A cooling structure of a power storage device including a storage battery bank in which a plurality of storage batteries are stacked, the cooling structure of a power storage device comprising:
   a cooling plate that cools the storage battery bank;
   a pair of spacers;
   a partition member that is disposed between the storage battery bank and the cooling plate and that includes
      a plurality of divided areas that are divided per each storage battery or per every plurality of storage batteries;
      a plurality of side walls; and
      a plurality of lock portions that protrude outward from respective ones of the side walls toward an outside of the divided areas, the lock portions being press fitted into the pair of spacers such that the pair of spacers sandwich the divided areas via the side walls of the partition member; and
   a heat conduction material that is accommodated in each of the divided areas and that is in contact with a corresponding storage battery and the cooling plate.

2. The cooling structure according to claim 1, wherein
   the partition member includes a partition wall that extends between the storage batteries, and
   a rib portion that protrudes towards a corresponding storage battery and that positions the storage battery is provided on the partition wall.

3. The cooling structure according to claim 2, wherein
   a projection portion that is inserted into the cooling plate and that suppresses a gap from being created between the cooling plate and the partition member is provided on the partition wall.

4. The cooling structure according to claim 1, wherein a space in which no heat conduction material is filled is formed in each of the divided areas.

5. A cooling structure of a power storage device, comprising:
a cooling plate to cool a storage battery bank including storage batteries which are stacked;
a pair of spacers;
a partition member disposed between the storage battery bank and the cooling plate and including
divided areas, at least one of the storage batteries being provided in each of the divided areas;
side walls; and
a plurality of lock portions that protrude outward from respective ones of the side walls toward an outside of the divided areas, the lock portions being press fitted into the pair of spacers such that the pair of spacers sandwich the divided areas via the side walls of the partition member; and
a heat conduction material accommodated in at least one of the divided areas and being in contact with the at least one of the storage batteries and the cooling plate.

6. The cooling structure according to claim 5,
wherein the partition member includes a partition wall that extends between the storage batteries, and
wherein a rib portion that protrudes towards a corresponding storage battery among the storage batteries and that positions the corresponding storage battery is provided on the partition wall.

7. The cooling structure according to claim 6,
wherein a projection portion that is inserted into the cooling plate and that suppresses a gap from being created between the cooling plate and the partition member is provided on the partition wall.

8. The cooling structure according to claim 5,
wherein a space in which no heat conduction material is filled is provided in each of the divided areas.

9. The cooling structure according to claim 6,
wherein the rib portion comprises positioning rib portions which are provided along the partition wall at predetermined intervals.

10. The cooling structure according to claim 7,
wherein the projection portion bulges toward the cooling plate and extends along the partition wall.

11. A cooling structure of a power storage device comprising:
a cooling plate configured to cool an interior of the power storage device;
a partition member that is disposed between the interior and the cooling plate and that includes
a pair of spacers in contact with the partition member and connected to the partition member in a liquid tight state;
a plurality of divided areas that are each configured to receive at least one storage battery;
a plurality of side walls; and
a plurality of lock portions that protrude outward from respective ones of the side walls towards an outside of the divided areas, the lock portions being press fitted into the pair of spacers such that the pair of spacers sandwich the divided areas via the side walls of the partition member;
a heat conduction material that is accommodated in each of the divided areas and that is in contact with the cooling plate.

12. The cooling structure according to claim 11, further comprising:
a plurality of storage batteries disposed in the divided areas; and
a connecting band that holds the storage batteries, wherein
the spacer is in contact with surfaces of the batteries and a portion of the connecting band.

13. The cooling structure according to claim 11, wherein
the partition member includes a partition wall that extends between the divided areas, and
a rib portion that protrudes towards a corresponding divided area is provided on the partition wall.

14. The cooling structure according to claim 13, wherein
a projection portion that is inserted into the cooling plate and that suppresses a gap from being created between the cooling plate and the partition member is provided on the partition wall.

15. The cooling structure according to claim 11, wherein
an empty space immediately adjacent to the heat conduction material in which no heat conduction material is filled is formed in each of the divided areas.

* * * * *